BEST AVAILABLE COPY

W. P. Maxson.
Self Raking Harvester.

No. 3,467. Reissued May 25, 1869.

UNITED STATES PATENT OFFICE.

J. WHEELER, JR., OF AUBURN, NEW YORK, ASSIGNEE OF W. P. MAXSON.

IMPROVEMENT IN HARVESTERS.

Specification forming part of Letters Patent No. 15,701, dated September 9, 1856; Reissue No. 3,467, dated May 25, 1869.

*To all whom it may concern:*

Be it known that W. P. MAXSON, of Albion, in the county of Dane and State of Wisconsin, did invent certain new and useful Improvements in Grain and Grass Harvesting Machines, of which the following is a full and exact description, reference being had to the accompanying drawings, making part of this specification, in which—

Figure 1:
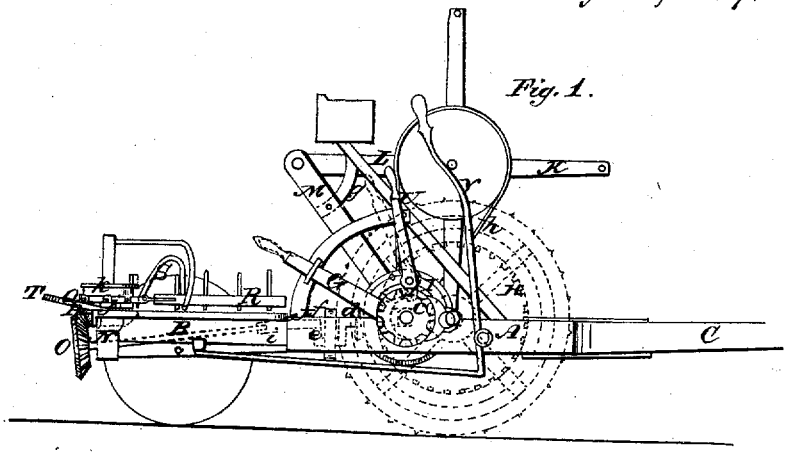
Figure 2:
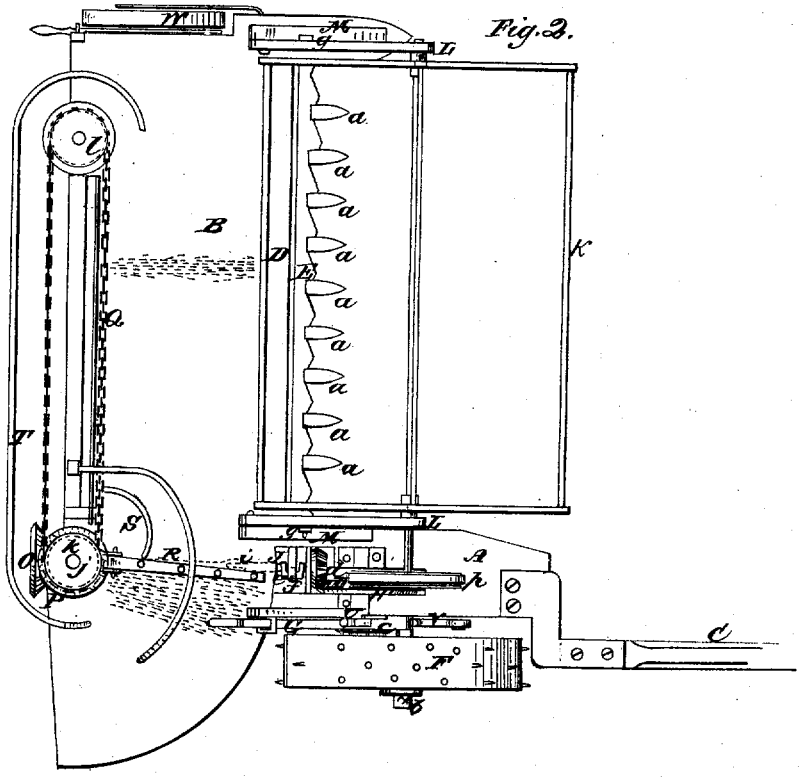

Figure 1 is a side elevation of the machine. Fig. 2 is a plan or top view of the same, and Fig. 3 is a detached view of the crank-movement by which the cutter is operated.

Similar letters of reference indicate corresponding parts in each of the figures.

The invention relates to the construction of a harvesting-machine having the main or cutter frame wholly on one side of the driving-wheel, said wheel having no outside support and being free to vibrate in an arc of a circle the center of which is coincident with the center of the bevel-wheel shaft.

The nature of the invention will be fully understood from the following description.

A is the main or cutter frame, made in one piece, and to which is attached the finger-bar D and grain-platform B.

The cutter E is of the usual construction, reciprocating in the slotted guard-fingers *a*, as shown in Fig. 2.

F is the main driving-wheel, mounted upon an arm or support, G, pivoted upon and vibrating about the bevel-wheel shaft H′, mounted in suitable bearings upon the cutter-frame A. The wheel F being free to vibrate about the shaft H′, the vertical adjustment of the cutter-frame can be readily effected, as hereinafter explained.

H is a toothed rim on wheel F, engaging with and driving the pinion *c*, keyed to shaft H′.

I is a bevel-wheel, rigidly attached to shaft H′, and meshing with the pinion *d* upon one end of the crank-shaft J, which is provided at its opposite end with a crank, *e*, working in a loop, *f*, secured to one end of the cutter E, thereby giving it (the cutter) the desired reciprocating motion. The arm G is slotted longitudinally at the point at which it is pivoted upon the shaft H′, as shown in dotted lines in Fig. 1, thus allowing the toothed rim H to be thrown in and out of gear with the pinion *c* by means of the lever U, pivoted upon a standard on the cutter-frame A, the lower end of said lever engaging with the arm G for the purpose of effecting the necessary longitudinal throw of said arm.

K is the reel, the shaft of which is supported in bearings on arms L L, pivoted to standards M M, one of which is attached to the cutter-frame and the other to the outside of the grain-platform. The arms L L are supported and adjusted by segments *g g*, and may be raised and lowered, so that the reel may be adjusted and supported at any desired height from the platform. The reel is driven by a belt, *h*, from the shaft H′. The shaft J is connected by a forked coupling, *i*′, with a shaft, N, having a bevel-wheel, O, on its outer end. This bevel-wheel O gears with a corresponding wheel, P, which is placed on a small upright shaft, *j*, at the back part of the grain-platform B.

On the shaft *j* a pulley, *k*, is placed, said pulley being secured to the wheel P. To the back part of the platform, and near its outer end, is attached a pulley, *l*, and an endless chain, Q, passes around the two pulleys *k* and *l*, said chain having a rake, R, attached to it. A curved rod, S, is also attached to the chain just back of the rake, said rod serving as a bearing for the rake.

T is a rod or guide attached to the back of the grain-platform B, and serving as a rest or support for the rake while passing around the back of the platform.

V is a lever pivoted upon the main or cutter frame A, and connected by means of the link *w* to the shaft N, for the purpose of sliding said shaft backward relative to the shaft J, thereby throwing the wheel O out of gear with the wheel P and causing a pause or cessation of the rake R, the forked coupling *i* allowing the necessary movement of the shaft N without its becoming disconnected from the shaft J. W is a grain or carrying wheel, mounted on a lever or arm pivoted upon the outside of the grain-platform in such manner that said wheel is adjustable vertically.

From the foregoing description it will be apparent that as the machine is propelled over the surface of the ground the cutter is vibrated by means of the crank *e*, working in the loop *f*, and the cut grain is spread by means of the reel K upon the grain-platform B, from which it is swept by the rake R, passing over said platform and depositing the grain in the rear of the machine outside the line of cut.

It will also be seen that the cutter-frame and cutter-bar may be supported at any desired height from the ground by elevating or depressing the arm G, as shall be necessary, and then securing said arm to a segment-rim on the cutter-frame by means of a staple or other device.

Having thus described the construction and operation of the harvester, what is claimed as the invention of W. P. MAXSON, and is sought to be secured by Letters Patent, is—

1. An adjustable cutter-frame made in one piece, adapted to support a laterally-projecting finger-bar, and the bevel-wheel and pinion-shaft for operating the cutters, in combination with an arm or support for the driving-wheel, which is adjustable upon or around the pinion-shaft as a center.

2. A driving-wheel located outside of the cutter-frame on a vibrating arm or support, in combination with an adjustable cutter-frame and reciprocating cutters.

3. A driving-wheel mounted on a vibrating arm outside of the cutter-frame, said wheel having no outside support, in combination with an adjustable cutter-frame, a cutter-bar, a grain-platform, and an adjustable grain-wheel.

4. The vibrating drive-wheel arm or support located outside the cutter-frame and provided with a lever for adjusting the height of said cutter-frame, substantially as described.

5. The combination, in a harvesting-machine, of the following elements, namely: a cutting apparatus and a gear-frame arranged inside of the driving-wheel, which is adjustable around the axial center of the first pinion-shaft, a platform to receive and an automatic rake to discharge the grain at one side, out of the path of the cutters, and a seat for the driver, so located that he will sit behind the axis of the driving-wheel.

C. WHEELER, JR.

Witnesses:
J. T. M. DAVIE,
S. E. PAYNE.